No. 767,316. PATENTED AUG. 9, 1904.
J. H. SPENCER.
SAFETY DEVICE FOR ELECTRICALLY PROPELLED VEHICLES.
APPLICATION FILED APR. 13, 1900.
NO MODEL.

WITNESSES:
Joshua Bergstrom
Geo. Hoster

INVENTOR
James H. Spencer.
BY
ATTORNEYS.

No. 767,316.

Patented August 9, 1904.

UNITED STATES PATENT OFFICE.

JAMES H. SPENCER, OF NEW YORK, N. Y.

SAFETY DEVICE FOR ELECTRICALLY-PROPELLED VEHICLES.

SPECIFICATION forming part of Letters Patent No. 767,316, dated August 9, 1904.

Application filed April 13, 1900. Serial No. 12,724. (No model.)

*To all whom it may concern:*

Be it known that I, JAMES H. SPENCER, a citizen of the United States, and a resident of the city of New York, borough of Manhattan, in the county and State of New York, have invented a new and Improved Safety Device for Electrically-Propelled Vehicles, of which the following is a full, clear, and exact description.

The invention relates to electrically-propelled vehicles—such as automobiles, trolley-cars, and the like; and the object of the invention is to provide a new and improved safety device for such vehicles, whereby the motor and the source of electricity are instantly disconnected in case of an accident to bring the motor, and consequently the vehicle, to a stop and insure the safety of the occupants of the vehicle.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in both the views.

Figure 1:
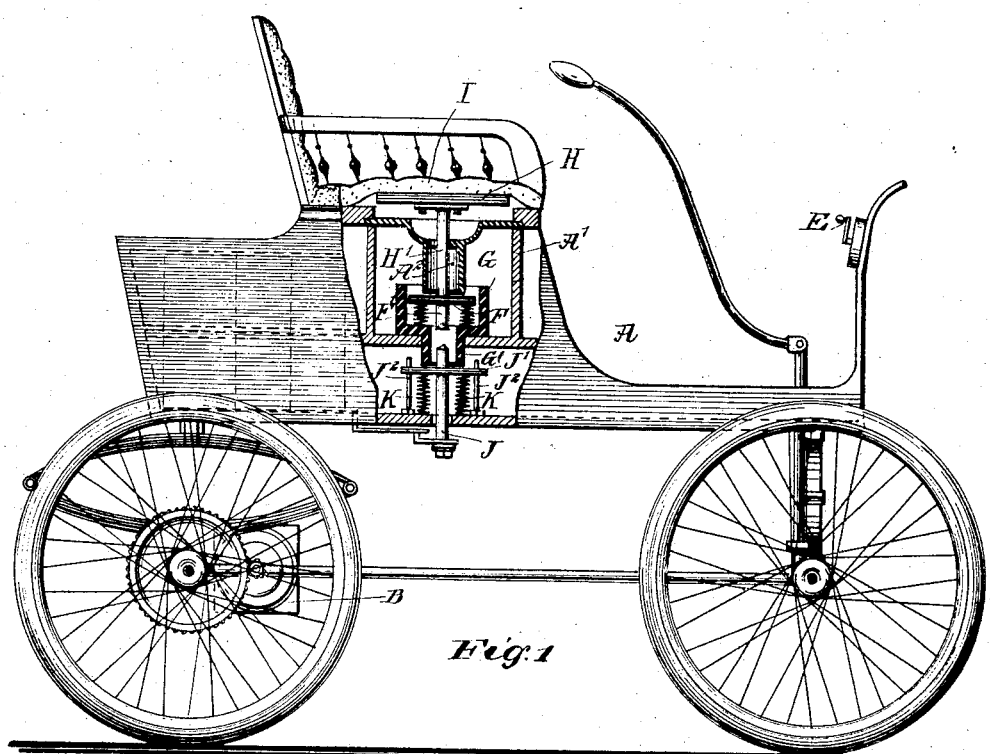
Figure 2:
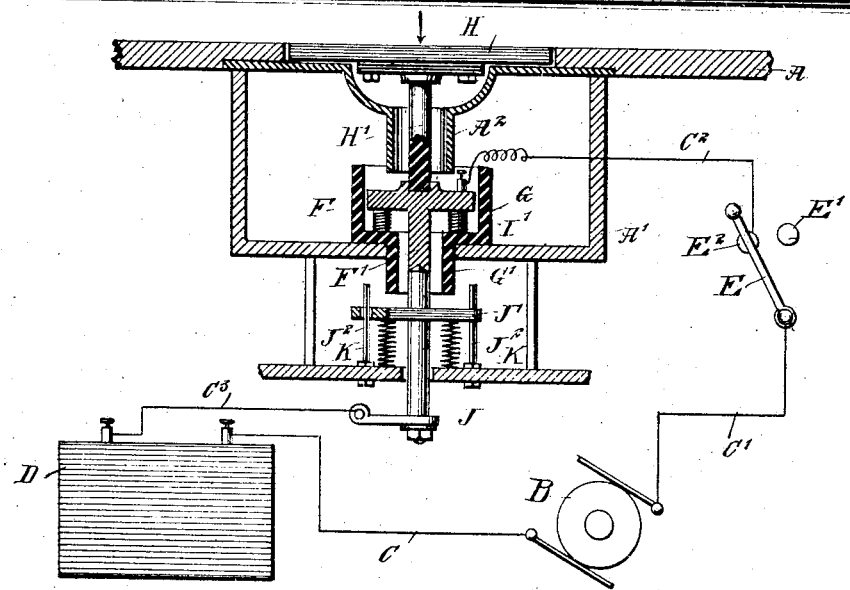

Figure 1 is a sectional side elevation of the improvement as applied to an automobile, part of which is broken out; and Fig. 2 is an enlarged sectional side elevation of the improvement and showing the motor, the source of electricity, and the electrical connection diagrammatically.

The vehicle A, on which the improvement is applied, is of any approved construction and carries a motor B, connected by a wire C with a source of electricity D, which may be in the form of a battery carried by the vehicle, by a feed-wire, or the like. The motor B is also connected by a wire C' with a switch E within convenient reach of the operator of the vehicle, as indicated in Fig. 1, and said switch has two contact-points E' E², of which the point E² is connected by a wire C² with a binding-post on an arm or plate F, mounted to slide vertically in an insulated cup G, contained in a box A', carried by or forming part of the vehicle A, as indicated in the drawings.

In the top of the arm F is formed a socket for receiving the lower end of a stem H' of insulating material and attached to the under side of a seat H, on which the operator is to be seated, said seat being preferably covered by a cushion I, as illustrated in Fig. 1. The under side of the arm F rests on springs I', contained in the cup G, to normally hold said arm and said seat in an uppermost position, as shown in Fig. 1, the upward movement of the seat being limited by the arm F, abutting against a projection A² of the box A'. From the bottom of the arm F depends a contact-rod F', countersunk at its lower end to engage the pointed upper end of a contact-rod J, connected by a wire C³ with the source of electricity D, as is plainly shown in Fig. 2. The rod J is provided with a guide-arm J', mounted to slide on suitable bearings J², carried by the box A', and said guide-arm is pressed on at the under side by springs K, so as to normally hold the contact-rod J in an uppermost position. A tubular extension G' at the bottom of the cup G serves as a stop for the guide-arm J'.

Now it will be seen that by the arrangement described the springs I' normally hold the arm F and seat H in an uppermost position, the lower end of the contact-rod F' being out of engagement with the upper end of the contact-rod J; but when the operator is seated on the seat H then the latter is moved into a lowermost position against the tension of the springs I', so that the contact-rod F' moves in contact with the rod J, which yields downward, owing to the springs K, to insure a perfect contact between the rods F' and J as long as the operator is seated on the seat H.

When the switch E is in a closed position, as shown in Fig. 2, then the circuit is closed or completed and the electricity passes to the motor B, so as to actuate the same, and thereby propel the vehicle.

Now in case the operator is thrown off the seat or leaves the same then the springs I' immediately force the arm F, and with it the seat H, upward, so that the contact between the rods F' and J is broken, and consequently the circuit is broken, and the source of electricity is shut off from the motor B to bring the latter to a stop, and with it the vehicle.

From the foregoing it is evident that when the switch is in an open position, with the switch-lever on the contact-point E', then the seating of the operator does not close the circuit, and the circuit is not closed even after the operator is seated until the latter has moved the switch E to a closed position—that is, has moved the switch-lever over upon the contact-point $E^2$.

By having the insulating arrangement described it is evident that short-circuiting is completely prevented; but it is expressly understood that the circuit cannot be completed by the switch E unless the seat H is moved downward by the operator occupying the seat. It is further evident that both contact-rods F' and J are yieldingly mounted, and consequently the said rods when in contact are not liable to accidentally become disconnected owing to jolting or jarring of the vehicle when passing over a rough road.

Having thus fully described my invention, I claim as new and desire to secure by Letters Patent—

1. A safety device for electrically-propelled vehicles, comprising a circuit, a motor, a switch, and a contact device, which, with the said motor and switch is located in said circuit, said contact device being normally in an inactive position to hold the circuit open, and being adapted to be actuated by the operator to close the circuit, said contact device comprising spring-pressed members, one of which has electrical connection with the switch and the other with the source of electricity, one member being held by its springs normally out of contact with the other member, substantially as shown and described.

2. A safety device for electrically-propelled vehicles, comprising a circuit, a motor, a switch, and a contact device, which, with the said motor and switch is located in said circuit, said contact device being normally in an inactive position to hold the circuit open, and being adapted to be actuated by the operator to close the circuit, said contact device comprising spring-pressed members, one of which has electrical connection with the switch and the other with the source of electricity, one member being held by its springs normally out of contact with the other member, and the latter being yieldingly held in contact with the first member when the latter is pressed into an active position, as set forth.

3. An electric contact device, comprising spring-pressed members, one of which has electric connection with a switch and the other with a source of electricity, one member being held by its springs normally out of contact with the other member, and the latter being yieldingly held in contact with the first member when the latter is pressed into an active position, as set forth.

In testimony whereof I have signed my name to this specification in the presence of two subscribing witnesses.

JAMES H. SPENCER.

Witnesses:
   THEO. G. HOSTER,
   EVERARD BOLTON MARSHALL.